United States Patent
Goto et al.

(10) Patent No.: US 8,504,269 B2
(45) Date of Patent: Aug. 6, 2013

(54) DRIVING SUPPORT SYSTEM, METHOD, AND PROGRAM

(75) Inventors: Hirohiko Goto, Anjo (JP); Takashi Hayashi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 413 days.

(21) Appl. No.: 12/884,765

(22) Filed: Sep. 17, 2010

(65) Prior Publication Data
US 2011/0137535 A1    Jun. 9, 2011

(30) Foreign Application Priority Data

Dec. 4, 2009  (JP) ................................. 2009-276678

(51) Int. Cl.
*B60T 8/17*    (2006.01)
(52) U.S. Cl.
USPC .............. 701/70; 303/152; 303/151; 303/155
(58) Field of Classification Search
USPC ................. 701/70, 22, 48, 82, 71, 53, 51, 74;
303/152, 151, 3, 9.62, 9.69, 9.71, 113.1,
303/113.2, 113.5, 116.1, 186, 187, 155, 173,
303/139, 15, 147, 20, 22.1, 124, 146, 190;
188/70 R, 106 P, 72.1–72.3, 136, 24.14, 24.15,
188/195, 349, 197 P, 206 R, 218 R, 156,
188/182, 181 T, 180; 180/65.1, 65.21;
218/362, 375, 143, 146, 153, 372; 702/41;
340/40, 439; 382/106
See application file for complete search history.

(56) References Cited

U.S. PATENT DOCUMENTS

| | | | |
|---|---|---|---|
| 6,406,105 B1 * | 6/2002 | Shimada et al. | 303/152 |
| 2004/0212245 A1 * | 10/2004 | Tsunehara et al. | 303/3 |
| 2005/0057098 A1 * | 3/2005 | Bouchon | 307/10.1 |
| 2005/0269875 A1 | 12/2005 | Maki et al. | |
| 2006/0163942 A1 * | 7/2006 | Tsunehara et al. | 303/155 |
| 2008/0042489 A1 | 2/2008 | Lewis et al. | |
| 2008/0093179 A1 * | 4/2008 | Jager et al. | 188/72.2 |

FOREIGN PATENT DOCUMENTS

JP    A 2009-189074    8/2009

OTHER PUBLICATIONS

Mar. 15, 2011 European Search Report issued in EP 10 17 7440.

* cited by examiner

*Primary Examiner* — Marthe Marc-Coleman
(74) *Attorney, Agent, or Firm* — Oliff & Berridge, PLC

(57) ABSTRACT

Systems, methods and programs are provided for a vehicle that performs braking by a regeneration brake and a friction brake. The systems, methods, and programs determine that braking by the friction brake has been performed, acquire information indicating a situation in the vicinity of the vehicle, and determine a necessary braking force required for responding to the situation in the vicinity of the vehicle. When it is determined that the braking by the friction brake has been performed in a condition where the necessary braking force is less than or equal to a maximum braking force of the regeneration brake, the systems, methods, and programs, determine energy consumed by the friction brake and communicate notification information indicating the consumed energy to a driver.

20 Claims, 4 Drawing Sheets

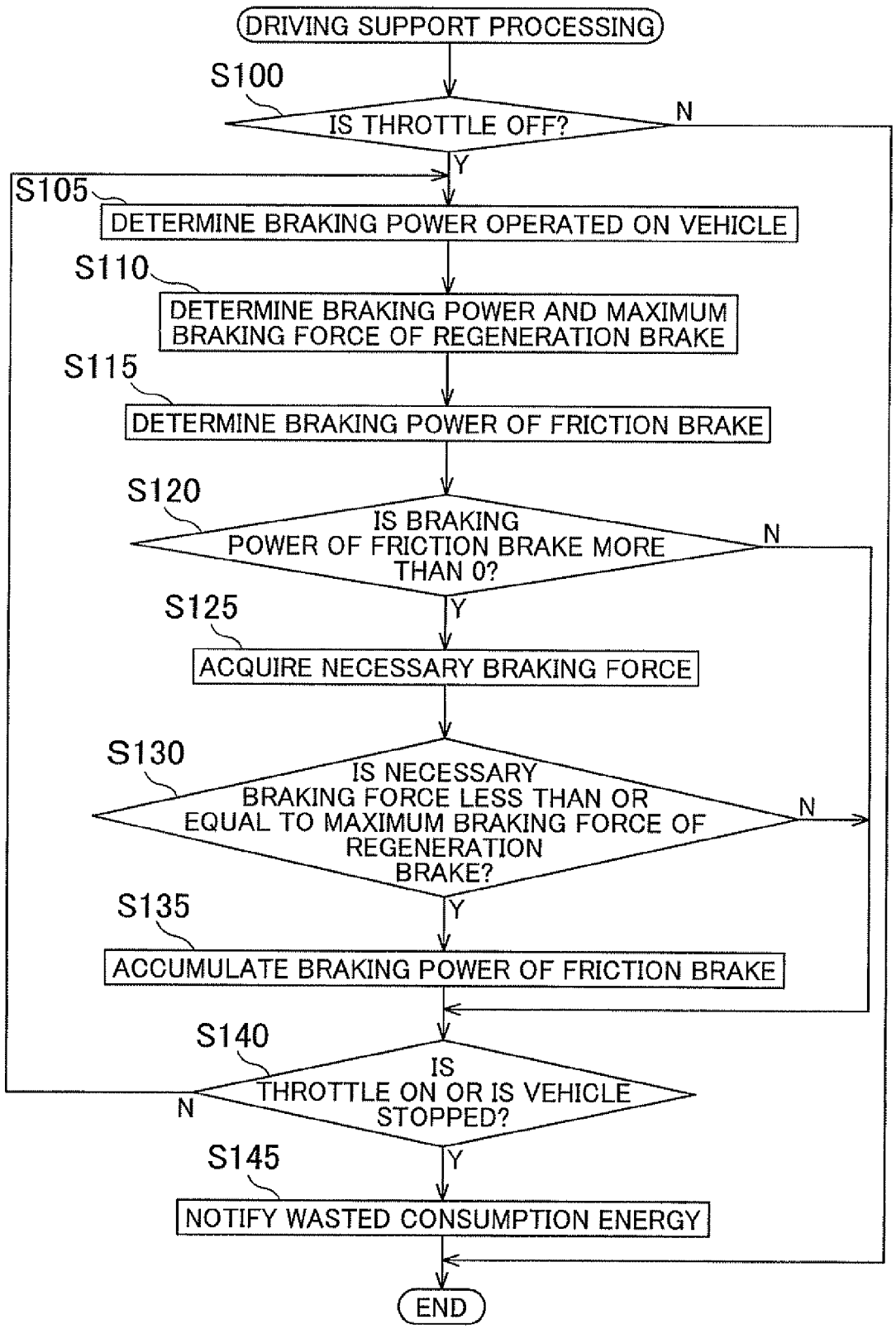

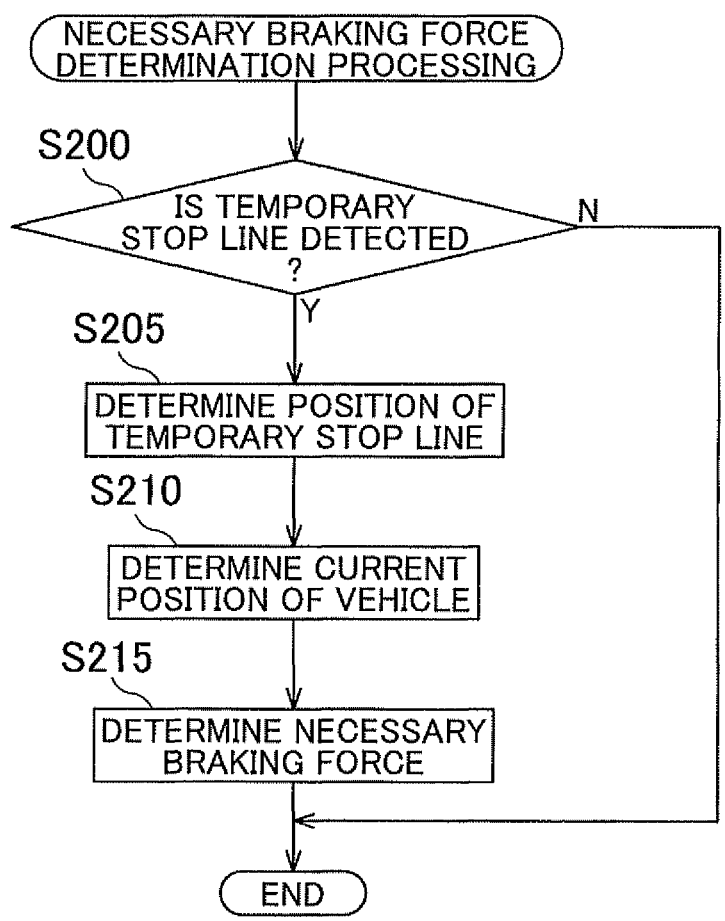

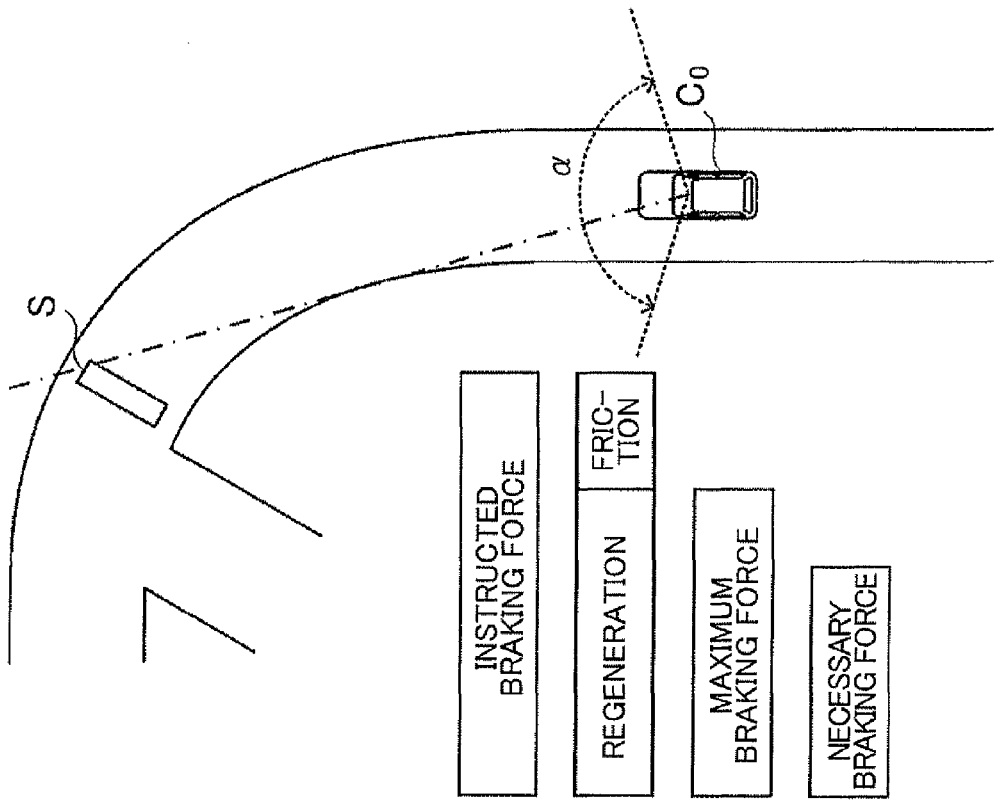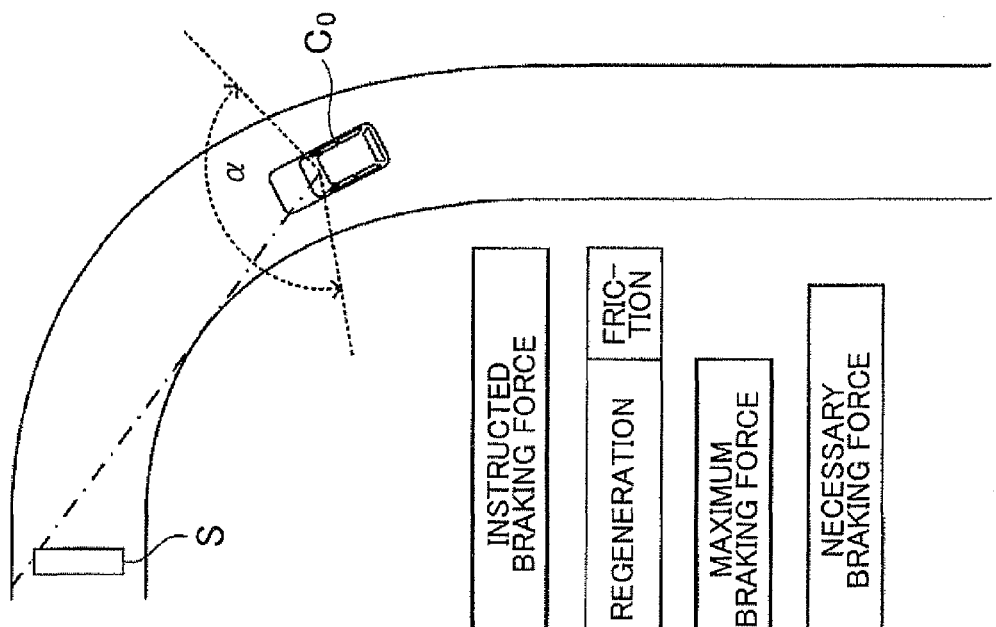

DRIVING SUPPORT SYSTEM, METHOD, AND PROGRAM

INCORPORATION BY REFERENCE

The disclosure of Japanese Patent Application No. 2009-276678, filed on Dec. 4, 2009, including the specification, drawings, and abstract thereof, is incorporated herein by reference in its entirety.

BACKGROUND

1. Related Technical Fields

Related technical fields include driving support systems, methods, and programs that accurately notify recoverable energy during driving.

2. Related Art

Conventionally, a technology to evaluate a braking operation causing braking by a friction brake, which was performed in a vehicle that is capable of recovering energy by a regeneration brake, is known. For example, Japanese Patent Application Publication No. JP-A-2009-189074 discloses that, when braking force required through the braking operation is generated by the regeneration brake and the friction brake, if the braking force required through the braking operation exceeds an ideal value of regenerative braking force, the excess is generated by the friction brake. In addition, Japanese Patent Application Publication No. JP-A-2009-189074 discloses that, if the excess was generated by the friction brake, it is notified to a driver that the friction brake was secondarily utilized to generate the braking force exceeding the ideal value of the regenerative braking force, so as to make a driver recognize that sudden braking was performed.

SUMMARY

In conventional technologies, if the braking force exceeding the ideal value of the regenerative braking force was generated by the friction brake, it is notified to the driver that the braking operation requiring the braking by the friction brake is an inappropriate operation.

However, when a vehicle actually travels along a road, in a case where a situation in the vicinity of the vehicle has changed, or the like, a driver usually actuates the friction brake by performing the braking operation to respond to the situation in the vicinity of the vehicle. When it is essential to perform such braking by the friction brake, energy consumption due to the braking by the friction brake is essential. On the other hand, when it is not essential to perform the braking by the friction brake, energy consumed due to the braking by the friction brake is wasted. That is, even when the braking by the friction brake has been performed, such operation causing the braking by the friction brake is not always an inappropriate operation.

Exemplary implementations of the broad inventive principles described herein provide a technology that makes the driver recognize that the wasted consumption energy has arisen due to the friction brake.

According to exemplary implementations, necessary braking force required for responding to the situation in the vicinity of the vehicle is determined, and if the braking by the friction brake has been performed in a condition where the necessary braking force is less than or equal to a maximum braking force of the regeneration brake, energy consumed due to the braking by the friction brake is determined and notified. That is, if the necessary braking force is less than or equal to the maximum braking force of the regeneration brake, the braking for responding to the situation in the vicinity of the vehicle can be accomplished by braking the vehicle only using the regeneration brake. Therefore, if the necessary braking force is less than or equal to the maximum braking force of the regeneration brake, the braking by the friction brake is not essential to respond to the situation in the vicinity of the vehicle, but the vehicle can be braked according to the situation in the vicinity of the vehicle without the braking by the friction brake.

Therefore, according to exemplary implementations, if the braking by the friction brake has been performed in a condition where the necessary braking force is less than or equal to the maximum braking force of the regeneration brake, the energy consumed due to the braking by the friction brake is considered wasted and the information indicating the energy consumed due to the braking by the friction brake is notified. As a result, the driver can recognize that the wasted consumption energy has arisen by the friction brake and the energy that could have been recovered by the regeneration brake was wastefully consumed.

Here, a friction braking determination unit is not limited provided that it can determine that the braking by the friction brake has been performed. The friction braking determination unit may detect with a sensor that the friction brake is operating, or judge whether or not a control part for controlling the friction brake has instructed to perform the braking by the friction brake. Or, the braking by the friction brake may be determined based on a difference between the braking force operated on the vehicle and the braking force by brakes other than the friction brake. Various configurations can be applied.

A vicinity situation information acquisition unit is not limited provided that it can acquire information indicating the situation in the vicinity of the vehicle. That is, the driver needs to perform driving operations according to various situations in the vicinity of the vehicle, and such various situations in the vicinity of the vehicle can influence the braking force required by the vehicle. Therefore, it is only necessary here to be able to determine the necessary braking force based on the information indicating the situation in the vicinity of the vehicle. The information indicating the situation in the vicinity of the vehicle may be acquired by an external information acquisition part installed in the vehicle to acquire information outside the vehicle. The external information acquisition part may be a camera, a millimeter waves radar, an infrared ray radar, and the like, or a communication part that acquires the information indicating the situation in the vicinity of the vehicle.

The situation in the vicinity of the vehicle is not limited provided that it is a situation that could influence the braking force to be required by the vehicle, and may be a situation of a feature outside the vehicle (another vehicle, a road, an installation on the road, or the like). An environment outside the vehicle (a weather, or the like) may be such situation. Or, a relative relation between the vehicle and the feature outside the vehicle (a relative position relation, a relative vehicle speed, or the like) may be such situation. Obviously, the situation in the vicinity of the vehicle may be defined by combining the respective situations.

A necessary braking force determination unit is not limited provided that it can determine the necessary braking force required for responding to the situation in the vicinity of the vehicle. That is, for a case where the driving operation that the driver should perform according to the situation in the vicinity of the vehicle is the braking operation, the necessary braking force to be generated by the braking operation may be previously determined, or a calculation method of the necessary braking force may be previously determined. The necessary braking force is determined based on the information indicating the situation in the vicinity of the vehicle. In addition, the necessary braking force is only necessary to be the braking force required in case that the braking for responding to the situation in the vicinity of the vehicle is essential, and it is only necessary to judge necessity of the braking based on the relation between the feature in the vicinity of the vehicle and the vehicle. That is, if the braking is necessary to decelerate the vehicle to a target speed or less at a target position that is determined from the feature in the vicinity of the vehicle based on the vehicle's speed and the distance between the feature in the vicinity of the vehicle and the vehicle, such braking force may be acquired as the necessary braking force.

A consumption energy notification unit is not limited provided that it can notify the information indicating the energy consumed by the friction brake if the braking by the friction brake has been performed in a condition where the necessary braking force is less than or equal to the maximum braking force of the regeneration brake. That is, it is only necessary, by acquiring the maximum braking force of the regeneration brake and comparing the necessary braking force with the maximum braking force of the regeneration brake, to judge whether or not the braking by the friction brake is essential and notify the information indicating the energy consumed by the friction brake according to the judgment result.

In addition, the necessary braking force and the maximum braking force of the regeneration brake may be directly compared, or may be indirectly compared (in a manner such that a judgment practically-equivalent to the direct comparison is performed). For example, if it is possible to decelerate the vehicle to the target speed or less at the target position that is set according to the situation in the vicinity of the vehicle by decelerating the vehicle with the maximum braking force of the regeneration brake, it may be considered that the necessary braking force is less than or equal to the maximum braking force of the regeneration brake.

In addition, the maximum braking force of the regeneration brake is not limited provided that it is the largest braking force that can be generated by the regeneration brake in the vehicle. Thus, if the vehicle can generate a maximum value of the braking force that is determined with respect to performance of a battery and a motor installed in the vehicle, the maximum value according to such performance will be the maximum braking force of the regeneration brake. Or, if an upper limit is practically set for the braking force that can be actually generated by the regeneration brake to give margin for the performance of the battery and the motor, such practical upper limit may be the maximum braking force of the regeneration brake. For example, to maintain the performance of the battery and the motor, the upper limit is previously set for a charging electric power, and the braking force that is generated by producing such charging electric power by the motor and charging the battery may be the maximum braking force of the regeneration brake. Or, if the upper limit of the braking force that can be generated by the regeneration brake changes according to the vehicle's speed, the vehicle's state, a braking operation volume, and the like, such upper limit may be the maximum braking force of the regeneration brake. Obviously, if the amount of charge in the battery is increased, the electric power that is acceptable for the battery is reduced, and such acceptable electric power becomes lower than the above-mentioned upper limit of the charging electric power, the braking force that can be generated by charging the battery with the acceptable electric power of the battery will be the maximum braking force of the regeneration brake.

A notification is not limited provided that it can make, by notifying the information indicating the consumed energy by the friction brake, the driver recognize that the wasted consumption energy has arisen. Thus, the energy consumed by the friction brake for a predetermined period of time (or a predetermined distance) may be displayed, or the energy utilized to generate the braking force exceeding the necessary braking force among the energy consumed by the friction brake may be displayed. Or, the information indicating the energy consumed by the friction brake may be notified by displaying comparison between the energy that is already collected by the regeneration brake and the energy that could have been collected by the regeneration brake.

Further, the situation in the vicinity of the vehicle may be defined based on the feature ahead of the vehicle. That is, as the driver performs the driving operation according to the feature within a visual field ahead of the driver, it is possible to determine, based on whether or not the feature that will be a reason for decelerating the vehicle exists within the visual field ahead of the driver, whether or not the situation that can induce the braking operation exists in the vicinity of the vehicle. Therefore, the information indicating the feature ahead of the vehicle is acquired, and it is determined, based on such information, whether or not the feature that will be the reason for decelerating the vehicle has appeared within the visual field of the driver. After the feature has appeared, the braking force required for reducing the vehicle's speed to the target speed or less in a travel section if the vehicle travels to a position corresponding to the feature, is acquired as the necessary braking force. Because of this configuration, if the driver has performed the braking by the friction brake to respond to the feature within the visual field of the driver, it is possible to determine whether or not the braking by the friction brake has been necessary for responding to the feature, determine whether or not the wasted consumption energy has arisen due to the braking by the friction brake, and notify the information.

Here, it is only necessary to acquire as the necessary braking force the braking force to be generated by the braking operation if the driver, in order to respond to the situation of the feature within the visual field of the driver, needs to decelerate the vehicle to the target speed or less before the vehicle arrives at the position corresponding to the feature by performing the braking operation. That is, it is only necessary, by determining a relation between the feature and the vehicle when the feature that will be the reason for decelerating the vehicle has appeared within the visual field of the driver, and then predicting a change between the feature and the vehicle in case of performing the braking, to determine the necessary braking force required for reducing the vehicle's speed to the target speed or less before the vehicle arrives at the position corresponding to the feature. For example, when the feature that will be the reason for decelerating the vehicle is a static feature, the necessary braking force may be determined by defining the travel section using the position of the static feature or the position at a predetermined distance from the static feature as the position corresponding to the feature. If the feature that will be the reason for decelerating the vehicle is a movable feature such as a vehicle, the necessary braking force may be determined by predicting a movement of the movable feature and defining the travel section using the position where the distance between the vehicle and the movable feature will be a predetermined distance as the position corresponding to the feature.

The situation in the vicinity of the vehicle may be defined based on a road grade ahead of the vehicle. For example, based on the information indicating the road grade ahead of the vehicle, the braking force for preventing the vehicle from accelerating due to the road grade can be determined and acquired as the necessary braking force. Because of this configuration, if the driver has performed the braking by the friction brake for driving according to the road grade, it is possible to determine whether or not the wasted consumption energy has arisen due to the braking by the friction brake and notify the information.

Here, it is only necessary to determine, based on the road grade, the braking force to be operated on the vehicle in order to prevent the vehicle from accelerating due to the road grade. That is, as accelerating force is subjected on the vehicle due to a grade in a down-grade section, the braking force that is the same as the accelerating force and opposite in a direction needs to be operated on the vehicle in the down-grade section to prevent the acceleration. Therefore, the braking force that is the same as the accelerating force and opposite in a direction is acquired as the necessary braking force. Because of this configuration, in a condition where the acceleration on the vehicle has been prevented in the down-grade section, it is possible to determine whether or not the wasted consumption energy has arisen due to the braking by the friction brake and notify the information.

The situation in the vicinity of the vehicle may be defined based on a state of another vehicle traveling ahead of the vehicle. That is, if the other vehicle is traveling within a predetermined distance ahead of the vehicle, the driver may need to perform the braking operation to maintain an inter-vehicle distance with the other vehicle. Therefore, based on the information indicating the state of the other vehicle, the braking force required for adjusting the inter-vehicle distance between the vehicle and the other vehicle ahead of the vehicle is acquired as the necessary braking force. Because of this configuration, if the driver has performed the braking by the friction brake to adjust the inter-vehicle distance, it is possible to determine whether or not the wasted consumption energy has arisen due to the braking by the friction brake and notify the information.

Here, it is only necessary to acquire as the necessary braking force the braking force to be generated if the vehicle needs to be decelerated to adjust the inter-vehicle distance between the vehicle and the other vehicle ahead of the vehicle. That is, if the inter-vehicle distance has become less than or equal to a predetermined distance, the driver has the braking force operated on the vehicle to adjust the inter-vehicle to become longer. Here, the necessary braking force required for such adjustment may be determined according to the vehicle's speed, the speed of the other vehicle ahead of the vehicle, the inter-vehicle distance, and the like.

Further, according to exemplary implementations, a technique for considering the energy consumed due to the braking by the friction brake as the wasted consumption energy if the braking by the friction brake has been performed in a condition where the necessary braking force is less than or equal to the maximum braking force of the regeneration brake, can also be applied in the forms of a program and a method. In addition, the device, the method, and the program described above may be implemented in a stand-alone device, and it may be implemented through parts used in common with respective components provided in the vehicle. For example, it is possible to provide a navigation device that is equipped with the device described above, and to provide the method and the program as well. According to exemplary implementations, as desired, portions may be provided in the form of software and/or in the form of hardware, for example. Exemplary implementations may also be practiced in the form of a storage medium for a program that controls the device. The software storage medium may be a magnetic storage medium or a magneto optical storage medium. Furthermore, any storage medium that is developed henceforth can also be considered to be exactly the same.

BRIEF DESCRIPTION OF THE DRAWINGS

FIG. 2 is a flowchart showing driving support processing.

FIG. 3 is a flowchart showing necessary braking force determination processing.

FIGS. 4A and 4B show examples of the driving support processing in curved sections.

DETAILED DESCRIPTION OF EXEMPLARY IMPLEMENTATIONS

I. Structure of Navigation Device

Figure 1:
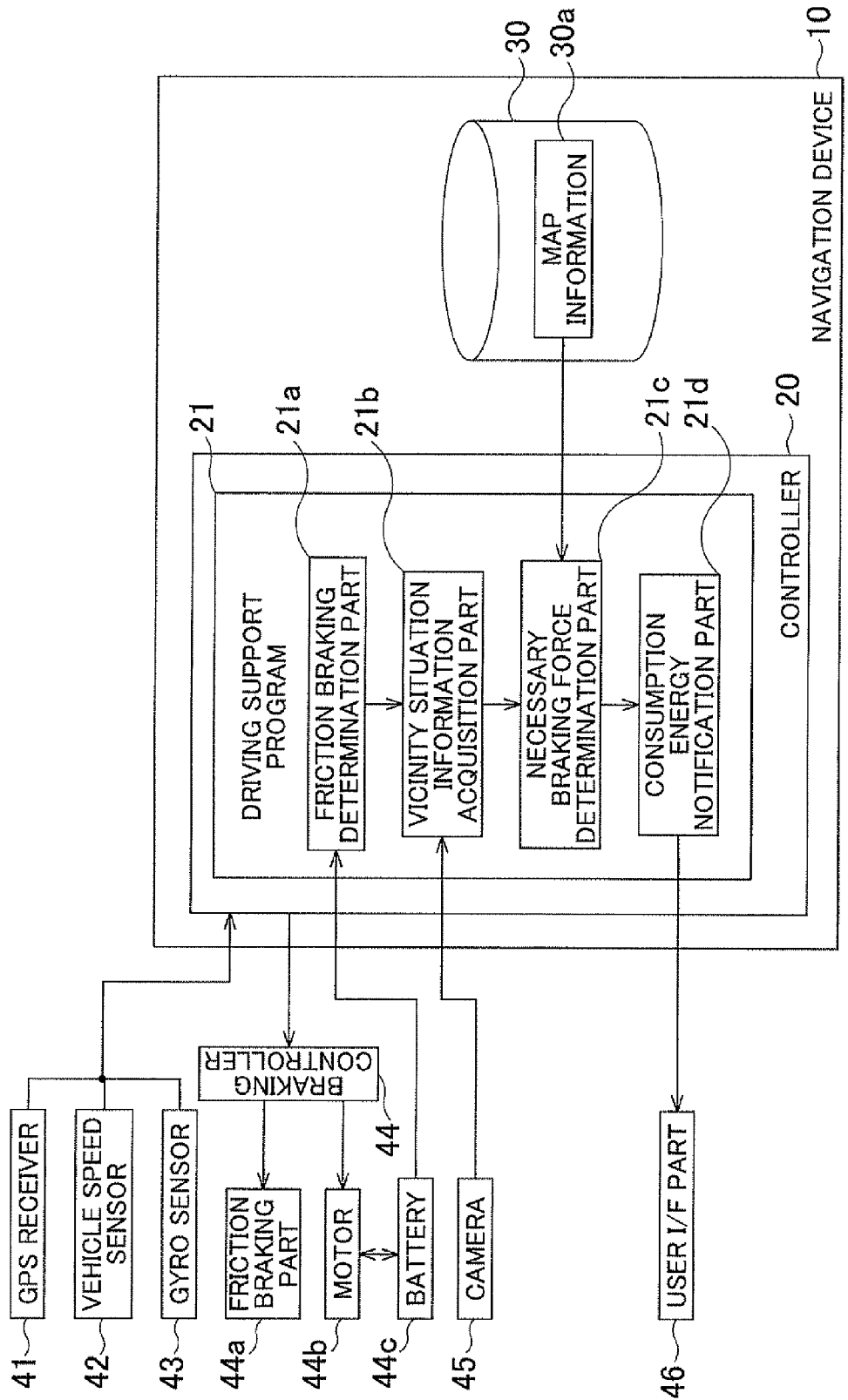
FIG. 1 is a block diagram of a navigation device including a driving support device.

FIG. 1 is a block diagram showing a structure of a navigation device 10 including a driving support device. The navigation device 10 includes a controller 20 and a storage medium 30. The controller 20 includes a CPU, a RAM, a ROM, and the like. Programs stored in the storage medium 30 and the ROM can be executed in the controller 20. In the present example, a driving support program 21 can be executed as such program. The driving support program 21 is executed while the controller 20 is executing navigation processing.

A vehicle in the present example is provided with a GPS receiver 41, a vehicle speed sensor 42, a gyro sensor 43, a braking controller 44, a friction braking part 44a, a motor 44b, a battery 44c, a camera 45, and a user I/F part 46. The controller 20 realizes functions by the driving support program 21 using the respective parts as needed.

The GPS receiver 41 receives radio waves from a GPS satellite and outputs information for calculating a current position of the vehicle via an interface (not shown). The controller 20 acquires the signal to determine the current position of the vehicle. The vehicle speed sensor 42 outputs the signal corresponding to a rotating speed of a wheel provided in the vehicle. The controller 20 acquires the signal via the interface (not shown) to determine a current speed of the vehicle. The gyro sensor 43 outputs the signal corresponding to an angular speed operated on the vehicle. The controller 20 acquires the signal via the interface (not shown) to determine a travel direction of the vehicle. The vehicle speed sensor 42 and the gyro sensor 43 are utilized to adjust the current position of the vehicle determined by the output signal of the GPS receiver 41. In addition, the current position of the vehicle is adjusted based on a travel track of the vehicle as appropriate.

The friction braking part 44a is a device that controls a pressure of a wheel cylinder for adjusting braking force by a friction brake installed in a wheel, and able to adjust the braking force by the friction brake according to a control signal from the braking controller 44. The motor 44b is provided with a rotator that is connected to an axle that drives a wheel through a gear (not shown). The motor 44b is able to generate electric power by the rotator of the motor 44b rotating according to rotation of the wheel, and charge the battery 44c with the generated electric power.

The battery 44c is connected to the motor 44b, is charged with the electric power generated by the motor 44b, supplies the charged electric power to the motor 44b, and drives the motor 44b. In this case, when the motor 44b rotates in receiving the supply of the electric power from the battery 44c, the rotation is transmitted to the wheel through the gear (not shown) and the vehicle goes forward or backward. In addition, the vehicle may be a hybrid vehicle provided with an engine (not shown), and driven by any one or both of the engine and the motor 44b. However, the vehicle may also be an electric vehicle without the engine.

In addition, the battery 44c is connected to the controller 20 via the interface (not shown). When the controller 20 outputs the control signal to the battery 44c, the signal indicating a state (a voltage, and the like) of the battery 44c is output from the battery 44c. The controller 20 determines the state of the battery 44c based on the signal.

The friction braking part 44a is connected to the braking controller 44 via the interface (not shown). The braking force of the friction brake is adjusted by the control signal output by the braking controller 44. In addition, the motor 44b is connected to the braking controller 44 via the interface (not shown). The braking controller 44 can adjust the braking force of a regeneration brake by outputting the control signal to the motor 44b, controlling the state of the electric generation, and causing regeneration braking. In the present example, the braking controller 44 is connected to the controller 20, and determines the braking force of the friction brake and the braking force of the regeneration brake according to the control signal output by the controller 20.

In the present example, the controller 20 determines the braking force corresponding to an operation volume of a braking force adjustment pedal (not shown) (hereinafter, referred to as an instructed braking force), and outputs the control signal indicating the instructed braking force to the braking controller 44. The braking controller 44 determines the braking force of the friction brake and the braking force of the regeneration brake such that a total of the braking force of the friction brake and the braking force of the regeneration brake is equal to the instructed braking force. The braking controller 44 determines the braking force of the friction brake and the braking force of the regeneration brake so as to utilize the regeneration brake by priority, and utilize the friction brake if the instructed braking force exceeds a maximum braking force that can be generated by the regeneration brake.

In addition, the instructed braking force corresponding to the operation volume of the braking force adjustment pedal and a torque generated by a propulsion shaft of the vehicle (for example, a propeller shaft of a rear-drive vehicle having the engine in front) according to the operation volume of the braking force adjustment pedal (hereinafter, referred to as an instructed torque) are determined with a predetermined map. That is, in the present example, a map is previously created, in which the operation volume of the braking force adjustment pedal and the current speed of the vehicle are associated with the instructed braking force and the instructed torque. When the braking force adjustment pedal is operated, the controller 20 refers to the map to determine the instructed braking force and the instructed torque corresponding to the operation volume of the braking force adjustment pedal and the current speed of the vehicle.

In the present example, the maximum braking force that can be generated by the regeneration brake is determined according to the performance of the battery 44c and the amount of charge of the battery 44c. That is, an upper limit of the charging electric power, which is necessary to maintain the performance of the battery 44c, is previously set. Normally, the braking force of the regeneration brake that is generated by charging the battery 44c with the upper limit of the charging electric power is the maximum braking force. When the amount of charge of the battery 44c is increased, the electric power that is acceptable for the battery 44c is reduced, and such acceptable electric power becomes lower than the above-mentioned upper limit of the charging electric power, the braking force that can be generated by charging the battery 44c with the acceptable electric power is the maximum braking force of the regeneration brake.

The camera 45 is installed in the vehicle such that a vicinity of the vehicle (front of the vehicle in the present example) is included in a field of view, and outputs image data indicating imaged view. The controller 20 acquires the image data via the interface (not shown) and image-converts the image data to determine whether or not a feature that will be a reason for decelerating the vehicle has appeared within a visual field of a driver.

The user I/F part 46 is an interface part for inputting an instruction of the driver or providing the driver with various kinds of information. The user I/F part 46 is provided with a touch panel display, a switch, a speaker (not shown), and the like. The controller 20 outputs the control signal to the user I/F part 46 to output various types of information.

To realize a function for notifying energy wastefully consumed due to braking by the friction brake, the driving support program 21 is provided with a friction braking determination part 21a, a vicinity situation information acquisition part 21b, a necessary braking force determination part 21c, and a consumption energy notification part 21d. In addition, map information 30a is previously stored in the storage medium 30.

The map information 30a includes node data indicating a node set on a road traveled by the vehicle, shape interpolating point data for determining a shape of the road between nodes, link data indicating a connection of nodes, and the like. The node data and the shape interpolating point data includes information indicating an altitude of a position on the road corresponding to the node and a shape interpolating point, and the link data includes information indicating whether or not a section is a grade section where a grade changes. Further, the map information 30a includes information indicating a position of the feature existing on the road such as, a temporary stop line. In the present example, the controller 20 can determine, based on the map information 30a, the current position of the vehicle, a traveling road, a road shape in the vicinity of the vehicle, and the like. That is, the controller 20 determines the current position of the vehicle based on the output signals of the GPS receiver 41, the vehicle speed sensor 42, the gyro sensor 43, and determines the road where the vehicle is traveling based on the current position of the vehicle and the map information 30a. In addition, the controller 20 refers to the node data and the shape interpolating point data set on the road in a predetermined area ahead of the traveling road to determine a curvature of the road and determine as a curve section a section where the curvature of the road is equal to or more than a predetermined value.

The friction braking determination part 21a is a module that causes the controller 20 to realize a function for determining that the braking by the friction brake has been performed. In the present example, by processing of the friction braking determination part 21a, the controller 20 considers that the power acquired by subtracting braking power by the regeneration brake from the braking power operated on the vehicle is the braking power by the friction brake, and determines that the braking by the friction brake was performed if the acquired power is more than 0.

The vicinity situation information acquisition part 21b is a module that causes the controller 20 to realize a function for acquiring the information indicating a situation of the vicinity of the vehicle. In the present example, the vicinity situation information acquisition part 21b acquires the information indicating the temporary stop line existing ahead of the vehicle as the information indicating the situation in the vicinity of the vehicle. That is, the driver needs to perform driving operations according to various situations in the vicinity of the vehicle, and such various situations in the vicinity of the vehicle can influence the braking force to be required by the vehicle. In the present example, if the temporary stop line exists ahead of the vehicle, the position of the temporary stop line is considered as the information indicating the situation in the vicinity of the vehicle, and the controller 20 acquires the image data output by the camera 45 by the processing of the vicinity situation information acquisition part 21b.

The necessary braking force determination part 21c is a module that causes the controller 20 to realize a function for determining necessary braking force required for responding to the situation in the vicinity of the vehicle. In the present example, if the temporary stop line has appeared within the visual field of the driver ahead of the vehicle, the temporary stop line is considered as the feature that will be the reason for decelerating the vehicle. Therefore, the controller 20 image-converts the above-mentioned image data that is the information indicating the situation in the vicinity of the vehicle and analyzes the converted image to determine whether or not the image having a character that accords with the character of the image of the temporary stop line exists within the image that corresponds to the visual field of the driver. Then, if the situation has changed from the situation where the image having a character that accords with the character of the image of the temporary stop line does not exist within the image that corresponds to the visual field of the driver to the situation where the image having a character that accords with the character of the image of the temporary stop line exists within the image that corresponds to the visual field of the driver, the controller 20 determines the position of the temporary stop line based on the position of the image of the temporary stop line in the image, and acquires such position as the information indicating the temporary stop line which is the feature that will be the reason for decelerating the vehicle.

If the information indicating the temporary stop line, which is the feature that will be the reason for decelerating the vehicle, is acquired, the controller 20 acquires as the necessary braking force the braking force required for reducing the vehicle's speed to a target speed or less in a travel section if the vehicle travels to the position of the temporary stop line after the temporary stop line has appeared within the visual field of the driver. In the present example, the target speed is 0 km/h, and the controller 20 determines as the necessary braking force the braking force required for decelerating the vehicle from the current speed to 0 km/h in the course of traveling the travel section, which is a section from the current position of the vehicle when the temporary stop line has appeared to the position of the temporary stop line.

The consumption energy notification part 21d is a module that causes the controller 20 to realize a function for notifying the information indicating the energy consumed by the friction brake if the braking by the friction brake has been performed in a condition where the necessary braking force is less than or equal to the maximum braking force of the regeneration brake. That is, in the present example, if the braking by the friction brake has been performed in a condition where the necessary braking force is less than or equal to the maximum braking force of the regeneration brake, the energy consumed due to the braking by the friction brake is considered wasted and the information indicating the energy consumed due to the braking by the friction brake is notified.

To perform the notification, the controller 20 determines the maximum braking force of the regeneration brake by the processing of the consumption energy notification part 21d. That is, the controller 20 compares the braking force of the regeneration brake generated by charging the battery 44c with a maximum value of the electric power that is acceptable per unit time for the battery 44c with the braking force of the regeneration brake generated by charging the battery 44c with a maximum generation electric power that can be generated by the motor 44b. Then, the smaller one between the two is defined as the maximum braking force of the regeneration brake.

Further, the controller 20 compares the necessary braking force with the maximum braking force of the regeneration brake. If the braking by the friction brake determined by the processing of the friction braking determination part 21a has been performed in a condition where the necessary braking force is less than or equal to the maximum braking force of the regeneration brake, the energy consumed due to the braking force by the friction brake is determined as wasted consumption energy. The wasted consumption energy consumed in a predetermined period is accumulated, and the control signal for displaying the accumulated wasted consumption energy is output to the user I/F part 46. As a result, the information indicating the wasted consumption energy consumed in the predetermined period is output from the user I/F part 46, and the driver can recognize that the wasted consumption energy has arisen by the friction brake and the energy that could have been recovered by the regeneration brake was wastefully consumed.

II. Driving Support Process

Next, driving support process or method is described in detail. FIG. 2 is a flowchart showing an exemplary algorithm of the driving support process. The exemplary process/method may be implemented, for example, by one or more components of the above-described navigation device 10. For example, the exemplary algorithm may be implemented as one or more computer programs stored in stored in the RAM, ROM, Storage Medium 30 or the like, and may be executed by the controller 20. The driving support processing is executed at predetermined intervals (for example, intervals of 100 ms) while the vehicle is traveling.

In the driving support processing, the controller 20 judges whether or not a throttle is off (Step S100). That is, the controller 20 acquires the output signal of a sensor (not shown) that detects opening of a throttle valve installed in the vehicle. If the output signal indicates that the throttle valve is close, the controller 20 judges that the throttle is off. If it is not judged that the throttle is off at Step S100, the processing of Step S105 and subsequent steps are skipped.

If it has been judged that the throttle is off at Step S100, the controller 20 determines the braking power of the friction brake by the processing of the friction braking determination part 21a at Steps S105 to S115. In the present example, the controller 20 determines the braking power operated on the vehicle (Step S105). That is, the controller 20 acquires the current speed of the vehicle based on the output signal of the vehicle speed sensor 42, and acquires the operation volume of the braking force adjustment pedal (not shown) based on the output signal of the sensor that detects the operation volume of the braking force adjustment pedal (not shown). In addition, the controller 20 refers to the above-mentioned map to determine an instructed torque T corresponding to the operation volume of the braking force adjustment pedal. Further, the controller 20 determines a rotation number R of the propulsion shaft corresponding to the current speed of the vehicle based on a radius of a wheel, a differential gear rate, and the current speed of the vehicle. After that, braking power operated on the vehicle $P_b$ is determined according to the following Equation 1:

$$P_b = R \times T \tag{1}$$

Next, the controller 20 determines the braking power and the maximum braking force of the regeneration brake (Step S110). In the present example, the braking power of the regeneration brake is determined based on a status of a battery. That is, the controller 20 outputs the control signal to the battery 44c and acquires the signal output from the battery 44c according to the control signal, acquire values of electric current I, electric voltage E, internal resistance r of the battery 44c, and determines the braking power of the regeneration brake $P_e$ according to the following Equation 2:

$$P_e = (I \times E) - (I^2 \times R) \quad (2)$$

In addition, the controller 20 compares the braking force of the regeneration brake generated by charging the battery 44c with the upper limit of the charging electric power, which is necessary to maintain the performance of the battery 44c, with the braking force of the regeneration brake generated by charging the battery 44c with the electric power acceptable for the battery 44c. Then, the smaller one between the two is defined as the maximum braking force of the regeneration brake.

Next, the controller 20 determines the braking power and the braking force of the friction brake (Step S115). In the present example, the power acquired by subtracting the braking power by the regeneration brake from the braking power operated on the vehicle is considered as the braking power by the friction brake. Therefore, the controller 20 determines the braking power of the friction brake $P_f$ according to the following Equation 3:

$$P_f = P_b - P_e \quad (3)$$

Next, the controller 20 judges whether or not the braking power of the friction brake is larger than 0 by the processing of the friction braking determination part 21a (Step S120). That is, in the present example, if the braking power of the friction brake is larger than 0, it is considered that the braking by the friction brake has been performed. Then, if it has been judged that the braking power of the friction brake is larger than 0 at Step S120, the processing for notifying the wasted consumption energy is executed at Steps S125 to S135. If it is not judged that the braking power of the friction brake is larger than 0 at Step S120, Steps S125 to S135 are skipped.

At Step S125, the controller 20 acquires the necessary braking force required for responding to the situation in the vicinity of the vehicle by the processing of the vicinity situation information acquisition part 21b and the necessary braking force determination part 21c.

In the present example, the necessary braking force is determined by necessary braking force acquisition processing algorithm shown in FIG. 3. The exemplary process/method may be implemented, for example, by one or more components of the above-described navigation device 10. For example, the exemplary algorithm may be implemented as one or more computer programs stored in stored in the RAM, ROM, Storage Medium 30 or the like, and may be executed by the controller 20. The necessary braking force determination processing is executed at predetermined intervals (for example, intervals of 100 ms) while the vehicle is traveling.

In the necessary braking force determination processing, the controller 20 judges based on the image data output by the camera 45 whether or not the temporary stop line existing in the visual field of the driver ahead of the vehicle has been detected by the processing of the vicinity situation information acquisition part 21b and the necessary braking force determination part 21c (Step S200). If the temporary stop line is not detected, the processing is terminated. If the temporary stop line has been detected within the visual field of the driver, it means that the feature that will be the reason for decelerating the vehicle has appeared within the visual field of the driver. Therefore, the controller 20 determines the position of the temporary stop line and acquires the position as the information indicating the temporary stop line existing ahead of the vehicle by the processing of the necessary braking force determination part 21c (Step S205).

Further, the controller 20 determines the current position of the vehicle when the temporary stop line has appeared based on the output signals of the GPS receiver 41, the vehicle speed sensor 42, and the gyro sensor 43 by the processing of the necessary braking force determination part 21c (Step S210). Further, the controller 20 determines as the necessary braking force the braking force required for decelerating the vehicle from the current speed of the vehicle to 0 km/h as the target speed at the temporary stop line in the course of traveling the travel section, which is a section from the current position of the vehicle to the position of the temporary stop line (Step S215).

Here, the necessary braking force can be determined by various kinds of methods. For example, on the assumption of uniformly-accelerated motion, when defining the distance of the travel section as L, the current speed of the vehicle as $V_0$, and the target speed $V_1$, a necessary acceleration a (an acceleration when the travel direction of the vehicle is a positive direction) for reducing the current speed of the vehicle $V_0$ to the target speed $V_1$ can be acquired according to the following Equation 4:

$$a = \frac{(V_1^2 - V_0^2)}{2L_1} \quad (4)$$

and the necessary braking force can be acquired according to the following Equation 5:

$$\text{necessary braking force} = M \times a \quad (5)$$

M is a weight of the vehicle. In the present example, the necessary braking force acquired as a result of the processing shown in FIG. 3 as indicated above is acquired at Step S125. If the necessary braking force is not acquired at Step S125, the driving support processing is suspended.

Next, the controller 20 judges whether or not the necessary braking force is less than or equal to the maximum braking force of the regeneration brake by the processing of the consumption energy notification part 21d (Step S130). If it has been judged that the necessary braking force is less than or equal to the maximum braking force of the regeneration brake at Step S130, the controller 20 accumulates the braking power of the friction brake determined at Step S115 by the processing of the consumption energy notification part 21d (Step S135). On the other hand, if it is not judged that the necessary braking force is less than or equal to the maximum braking force of the regeneration brake at Step S130, Step S135 is skipped.

That is, if the necessary braking force is less than or equal to the maximum braking force of the regeneration brake, the vehicle can be decelerated and stopped at the position of the temporary stop line only by using the regeneration brake without using the friction brake. Therefore, when the necessary braking force is less than or equal to the maximum braking force of the regeneration brake, if the friction brake is utilized, the energy consumed due to the braking by the friction brake is the wasted consumption energy. Then, in the present example, if the necessary braking force is less than or equal to the maximum braking force of the regeneration brake, the braking power of the friction brake is accumulated for a period when the friction brake was utilized and the information indicating the wasted consumption energy is determined.

Next, the controller 20 judges whether or not the throttle is on or whether or not the vehicle is stopped (Step S140). That is, the controller 20 acquires the output signal of the sensor (not shown) that detects the opening of the throttle valve. If the output signal indicates that the throttle valve is open, it is judged that the throttle valve is on. Or, the controller 20 acquires the output signal of the vehicle speed sensor 42, and if the output signal is a value indicating that the vehicle is stopped, it is judged that the vehicle is stopped. Then, if it is not judged that the throttle is on or the vehicle is stopped at Step S140, Step S105 and subsequent processing is repeated. That is, a state where the throttle is on is a state where the braking in the vehicle has finished and the acceleration has started, and a state where the vehicle is stopped is a state where the braking in the vehicle has finished. Therefore, Step S105 and subsequent processing is repeated until the braking in the vehicle finishes.

On the other hand, it has been judged that the throttle is on or the vehicle is stopped at Step S140, the controller 20 notifies the wasted consumption energy by the processing of the consumption energy notification part 21d (Step S145). That is, the controller 20 determines an accumulated value of the braking power for each predetermined period (for example, every five minutes) based on the accumulated value of the braking power acquired by the processing at Step S135, and acquires the wasted consumption energy for each predetermined period. The controller 20 outputs to the user I/F part 46 the control signal for displaying the wasted consumption energy for each predetermined period. As a result, in the user I/F part 46, the wasted consumption energy for each predetermined period is displayed, and the driver can recognize the wasted consumption energy arisen for each predetermined period.

FIGS. 4A and 4B show examples of the driving support processing in the road where the temporary stop line exists ahead of the vehicle. In each figure, the vehicle provided with the navigation device 10 is shown as a vehicle $C_0$, and the temporary stop line existing ahead of the vehicle $C_0$ is shown as the temporary stop line S. In addition, an imaging range of the camera 45 in the vehicle $C_0$ is a range $\alpha$ between broken lines, and the visual field of the driver is included in the range $\alpha$. Further, in a curve section in the present example, a shielding material (not shown) exists on a center side of the curvature, and the center side of the curvature beyond the end of the road is blind. That is, in the visual range of the driver $\alpha$, the center side of the curvature beyond a dashed-dotted line is shielded.

In FIGS. 4A and 4B, various kinds of braking force are displayed by a bar chart. That is, from the right end, the instructed braking force that is determined according to the operation volume of the braking force adjustment pedal, the braking forces of the friction brake and the regeneration brake according to the instructed braking force, the maximum braking force of the regeneration brake, and the necessary braking force are shown. In the bar chart, the length in a vertical direction corresponds to a volume of the braking force.

In the examples shown in FIGS. 4A and 4B, a case in which the value is the same in the instructed braking force, the braking force by the friction brake, the braking force by the regeneration brake, and the maximum braking force of the regeneration brake, is shown. If the current speed of the vehicle $C_0$ is the same, the necessary braking force in FIG. 4A becomes larger because the distance between the vehicle $C_0$ and the temporary stop line S in FIG. 4A is shorter than the distance between the vehicle $C_0$ and the temporary stop line S in FIG. 4B.

FIG. 4A shows a case in which the necessary braking force is more than the maximum braking force of the regeneration brake. In this case, to perform the braking necessary for the driver driving the vehicle $C_0$ to respond to the temporary stop line S, the braking by the friction brake is essential. Therefore, in the present example, the energy consumed by the friction brake in a case such as FIG. 4A is not considered as the wasted energy.

On the other hand, FIG. 4B shows a case in which the necessary braking force is less than or equal to the maximum braking force of the regeneration brake. In this case, to perform the braking necessary for the driver driving the vehicle $C_0$ to respond to the temporary stop line S, the braking by the friction brake is not essential. Therefore, in the present example, the energy consumed by the friction brake in a case such as FIG. 4B is considered as the wasted energy and accumulated. The controller 20 notifies the accumulated wasted energy when the driver has completed the braking operation to respond to the temporary stop line S (when re-acceleration or stop has been performed). As a result, the driver can recognize that he or she has performed the braking operation to cause the wasted energy by the braking in the curve section.

III. Other Examples

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, other examples can be also applied provided that the energy consumed due to the braking by the friction brake is considered as the wasted consumption energy if the braking by the friction brake has been performed in a condition where the necessary braking force is less than or equal to the maximum braking force of the regeneration brake.

For example, various types of configurations can be applied to determine that the braking by the friction brake has been performed. Operation of the friction braking may be detected with the sensor. Or, it may be judged whether or not the braking controller 44 or the friction braking part 44a to control the friction brake has instructed the braking by the friction brake.

Further, the necessary braking force may be a value previously-determined in a map as the braking force to be generated by the braking operation in case that the driving operation that the driver should perform according to the situation in the vicinity of the vehicle is the braking operation. Or, the feature that will be the reason for braking the vehicle is not limited to the temporary stop line, but various types of features can be applied. Thus, the necessary braking force is not limited provided that it is the braking force in case that the braking for responding to the situation in the vicinity of the vehicle is essential. It is only necessary that necessity of the braking is judged based on a relation between the vehicle and the feature in the vicinity of the vehicle and the necessary braking force is determined. That is, if the braking is required for decelerating the vehicle to the target speed or less at the target position that is determined by the feature in the vicinity of the vehicle based on the vehicle's speed and the distance between the feature in the vicinity of the vehicle and the vehicle, such braking force may be acquired as the necessary braking force.

In addition, the situation in the vicinity of the vehicle is not limited provided that it is the situation that could influence the braking force required by the vehicle, and may be the situation of various types of features such as the road, the feature on the road, and the like, besides the temporary stop line. An environment outside the vehicle (a weather, or the like) may be such situation. Or, a relative relation between the vehicle and the feature outside the vehicle (a relative position relation, a relative vehicle speed, or the like) may be such situation. Obviously, the situation in the vicinity of the vehicle may be defined by combining the respective situations. The information indicating the situation in the vicinity of the vehicle may be acquired by an external information acquisition part that is installed in the vehicle to acquire information outside the vehicle. The external information acquisition part may be a camera, a millimeter waves radar, an infrared ray radar, and the like, or a communication part that acquires the information indicating the situation in the vicinity of the vehicle.

For example, as the information indicating the situation in the vicinity of the vehicle, the information indicating the situation of the braking operation of a preceding vehicle may be acquired. In this configuration, if the braking has become necessary for the vehicle along with the braking operation by the preceding vehicle, it is considered that the preceding vehicle as the feature that will be the reason for decelerating the vehicle has appeared within the visual field of the driver. Then, the braking force required for responding to the preceding vehicle (for example, for decelerating the vehicle to the target speed before the position of the preceding vehicle) is acquired as the necessary braking force. Because of this configuration, it is possible to make the driver recognize whether or not the wasted consumption energy has arisen to respond to sudden deceleration of the preceding vehicle.

Further, as the information indicating the situation in the vicinity of the vehicle, the information indicating the existence of the preceding vehicle cutting into the lane, the existence of the preceding vehicle being stopped for a right or left turn, the existence of a parked vehicle, the existence of the preceding vehicle traveling at a low speed due to congestion or the like, the existence of a pedestrian, the existence of a moving object (a bicycle or the like), the existence of an oncoming vehicle straying on to the opposite lane, the existence of an overtaking vehicle, or the like may be acquired. In these configurations, the feature such as the preceding vehicle or the parked vehicle is the feature that will be the reason for decelerating the vehicle. When the feature has appeared within the visual field of the driver, the braking force required for responding to the feature is acquired as the necessary braking force. Because of this configuration, it is possible to make the driver recognize whether or not the wasted consumption energy has arisen if the feature has become the reason for decelerating the vehicle.

Further, as the information indicating the situation in the vicinity of the vehicle, the information indicating the existence of the road where a lane changes (for example, a road where the number of lanes or the travel direction of the lane changes), the existence of a stop line on the road ahead, the existence of an intersection, the existence of traffic regulation (a closed road or the like), the existence of a railroad crossing, the existence of a toll gate, the existence of a road branch point (a merging point or an outgoing point), the existence of the road where a priority travel direction is determined, or the like may be acquired. That is, the information of the lane, the intersection, and the like is previously stored in the map information 30a, the information of the traffic regulation and the like is acquired by the communication part, and the controller 20 acquires the information indicating these features from the map information 30a. In these configurations, the feature such as the road where the lane changes, the stop line, or the like is the feature that will be the reason for decelerating the vehicle. When the feature has appeared within the visual field of the driver, the braking force required for responding to the feature is acquired as the necessary braking force. Because of these configurations, it is possible to make the driver recognize whether or not the wasted consumption energy has arisen if the feature has become the reason for decelerating the vehicle. Obviously, the information indicating the position where the feature as the reason for decelerating the vehicle becomes visible and the information indicating the position of the shielding material and the shielded area may be included in the map information 30a and the feature that will be the reason for decelerating the vehicle may be determined based on such information.

In the above examples, it is only necessary to acquire the braking force to be generated by the braking operation as the necessary braking force if the driver needs to decelerate the vehicle to the target speed or less before the vehicle arrives at the position corresponding to the feature through the braking operation to correspond to the situation of the feature within the visual field of the driver. That is, by determining a relation between the feature and the vehicle when the feature that will be the reason for decelerating the vehicle has appeared within the visual field of the driver and predicting a change of the relation between the feature and the vehicle if the braking is performed later, the necessary braking force required for reducing the vehicle's speed to the target speed or less before the vehicle arrives at the position corresponding to the feature may be determined. For example, when the feature that will be the reason for decelerating the vehicle is a static feature, the necessary braking force may be determined by defining the travel section using the position of the static feature or the position at a predetermined distance from the static feature as the position corresponding to the feature. If the feature that will be the reason for decelerating the vehicle is a movable feature such as a vehicle, the necessary braking force may be determined by predicting a movement of the movable feature and defining the travel section using the position where the distance between the vehicle and the movable feature will be a predetermined distance as the position corresponding to the feature.

Further, as the information indicating the situation in the vicinity of the vehicle, the information indicating a road grade ahead of the vehicle may be acquired. That is, the braking force for preventing the vehicle from accelerating due to the road grade ahead of the vehicle can be determined based on the information indicating the road grade. Then, the controller 20 acquires the information indicating the road grade ahead of the vehicle from the map information 30a and acquires the braking force required for preventing acceleration in a grade section as the necessary braking force. Because of this configuration, if the driver has performed the braking by the friction brake to respond to the road grade, it is possible to determine whether or not the wasted consumption energy has arisen due to the braking by the friction brake and notify the information.

Here, it is only necessary to determine, based on the road grade, the braking force to be operated on the vehicle in order to prevent the vehicle from accelerating due to the road grade. That is, as accelerating force is subjected on the vehicle due to a grade in a down-grade section, the braking force that is the same force as the accelerating force and opposite in a direction needs to be operated on the vehicle in a down-grade section to prevent the acceleration. Therefore, the braking force that is the same as the accelerating force and opposite in a direction is acquired as the necessary braking force. Because of this configuration, in a condition where the acceleration on the vehicle has been prevented in the down-grade section, it is possible to determine whether or not the wasted consumption energy has arisen due to the braking by the friction brake and notify the information.

Further, as the information indicating the situation in the vicinity of the vehicle, the information indicating a state of another vehicle traveling ahead of the vehicle may be acquired. That is, if the other vehicle is traveling within a predetermined distance ahead of the vehicle, the driver may need to perform the braking operation to maintain an inter-vehicle distance with the other vehicle. Therefore, based on the information indicating the state of the other vehicle, the braking force required for adjusting the inter-vehicle distance between the vehicle and the other vehicle ahead of the vehicle is acquired as the necessary braking force. Because of this configuration, if the braking by the friction brake has been performed to adjust the inter-vehicle distance, it is possible to determine whether or not the wasted consumption energy has arisen due to the braking by the friction brake and notify the information.

Here, it is only necessary to acquire as the necessary braking force the braking force to be generated if the vehicle needs to be decelerated to adjust the inter-vehicle distance between the vehicle and the other vehicle ahead of the vehicle. That is, if the inter-vehicle distance has become less than or equal to the predetermined distance, the driver has the braking force operated on the vehicle to adjust the inter-vehicle to become longer. Here, the necessary braking force for such adjustment may be determined according to the vehicle's speed, the speed of the other vehicle ahead of the vehicle, the inter-vehicle distance, and the like.

In addition, the necessary braking force and the maximum braking force of the regeneration brake may be directly compared as the above example. Or, these may be indirectly compared in a manner such that a judgment practically-equivalent to the direct comparison is performed. For example, if it is possible to decelerate with the maximum braking force of the regeneration brake the vehicle to the target speed or less at the target position that is set according to the situation in the vicinity of the vehicle, it may be considered that the necessary braking force is less than or equal to the maximum braking force of the regeneration brake.

In addition, the maximum braking force of the regeneration brake is not limited provided that it is the largest braking force that can be generated by the regeneration brake in the vehicle. Thus, if the vehicle can generate a maximum value of the braking force that is determined by the performance of the battery 44c and the motor 44b, the maximum value in the performance may be the maximum braking force of the regeneration brake. Or, if the upper limit of the braking force that can be generated by the regeneration brake changes according to the vehicle's speed, the state of the vehicle, the volume of the braking operation, and the like, such upper limit may be the maximum braking force of the regeneration brake.

For the notification of the wasted consumption energy, the energy consumed by the friction brake for a predetermined distance may be displayed, or the energy utilized to generate the braking force exceeding the necessary braking force among the energy consumed by the friction brake may be displayed. Or, comparison between the energy that is already collected by the regeneration brake and the energy that could have been collected by the regeneration brake may be displayed.

Further the target speed as a target in decelerating the vehicle is not limited to 0 km/h, but it may be a speed larger than 0 km/h. For example, a speed limit of the road in a low-speed section may be the target speed. Or, a speed that eliminates psychological burden of the driver with respect to the relation with the feature such as the temporary stop line may be the target speed. Various configurations may be applied. In these configurations, it is only necessary to associate the target speed with the data indicating the feature.

Further, a case is also applied, where the friction brake is performed regardless of whether or not the braking force by the regeneration brake has reached the maximum braking force, such as a case where an automatic deceleration control that is set in the vehicle such that the friction brake is mandatorily intervened is executed. In such case, even when the braking by the friction brake has been performed in a condition where the necessary braking force required for responding to the situation in the vicinity of the vehicle is less than or equal to the maxim braking force of the regeneration brake, the braking force generated by the mandatorily-intervened friction brake in the total braking force generated by the friction brake may not be considered as the wastefully-consumed energy but excluded from the consumed energy. That is, after the braking force generated by the mandatory intervention of the friction brake was excluded, if the braking force generated by the friction brake is larger than 0, the energy consumed by such braking force may be considered wasted and notified.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A driving support system for a vehicle that is capable of performing braking by a regeneration brake and a friction brake, the system comprising:
    a controller that:
        determines that braking by the friction brake has been performed;
        acquires information indicating a situation in the vicinity of the vehicle;
        determines a necessary braking force required for responding to the situation in the vicinity of the vehicle;
        acquires a maximum braking force of the regeneration brake;
        determines whether the braking by the friction brake has been performed in a condition where the necessary braking force is less than or equal to the maximum braking force of the regeneration brake;
        when it is determined that the braking by the friction brake has been performed in the condition where the necessary braking force is less than or equal to the maximum braking force of the regeneration brake, determines energy consumed by the friction brake;
        generates notification information indicating the consumed energy; and
        causes the generated notification information to be communicated to a driver.

2. The driving support system according to claim 1, wherein the controller:
    acquires information indicating a feature ahead of the vehicle as the information indicating the situation in the vicinity of the vehicle; and based on the information indicating the feature ahead of the vehicle, acquires as the necessary braking force, a braking force required to reduce the vehicles speed to a target speed or less from a position at which the feature ahead of the vehicle will come into the driver's view to a position of the feature ahead of the vehicle.

3. The driving support system according to claim 1, wherein the controller:
   acquires information indicating a road grade ahead of the vehicle as the information indicating the situation in the vicinity of the vehicle; and
   based on the information indicating the road grade ahead of the vehicle, acquires as the necessary braking force, a braking force for preventing the vehicle from accelerating due to the road grade.

4. The driving support system according to claim 1, wherein the controller:
   acquires information indicating a state of another vehicle traveling ahead of the vehicle as the information indicating the situation in the vicinity of the vehicle; and
   based on the information indicating the state of the other vehicle, acquires as the necessary braking force, a braking force required for adjusting an inter-vehicle distance between the vehicle and the other vehicle.

5. The driving support system according to claim 1, wherein the controller:
   acquires a maximum value of electric power that is acceptable per unit time for charging a battery of the vehicle;
   determines a first braking force required to generate the maximum value of electric power that is acceptable per unit time for charging a battery of the vehicle;
   acquires a maximum value of electric power that can be generated by a motor of the vehicle;
   determines a second braking force required to generate the maximum value of electric power that can be generated by a motor of the vehicle; and
   determines the smaller of the first braking force and the second braking force to be the maximum braking force of the regeneration brake.

6. The driving support system according to claim 1, wherein the controller:
   acquires information indicating a presence of a pedestrian ahead of the vehicle as the information indicating the situation in the vicinity of the vehicle; and
   based on the information indicating the presence of the pedestrian, acquires as the necessary braking force, a braking force required to stop before reaching the pedestrian.

7. The driving support system according to claim 1, wherein the controller:
   acquires information indicating a lane change ahead of the vehicle as the information indicating the situation in the vicinity of the vehicle; and
   based on the information indicating the lane change, acquires as the necessary braking force, a braking force required to achieve a safe speed for changing lanes at the lane change.

8. The driving support system according to claim 1, wherein the controller:
   acquires information indicating a presence of a traffic regulation ahead of the vehicle as the information indicating the situation in the vicinity of the vehicle; and
   based on the information indicating the presence of the traffic regulation, acquires as the necessary braking force, a braking force required to safely travel through the traffic regulation.

9. The driving support system according to claim 1, wherein the controller:
   acquires information indicating a turn along the vehicle's route ahead of the vehicle as the information indicating the situation in the vicinity of the vehicle; and
   based on the information indicating the presence of the turn along the vehicle's route, acquires as the necessary braking force, a braking force required to achieve a safe speed for turning at the turn.

10. A navigation system comprising:
    the driving support system of claim 1; and
    a display on which the generated notification information is communicated to the driver.

11. A driving support method for a vehicle that is capable of performing braking by a regeneration brake and a friction brake, the method comprising:
    determining, with the controller, that braking by the friction brake has been performed;
    acquiring information indicating a situation in the vicinity of the vehicle;
    determining, with the controller, a necessary braking force required for responding to the situation in the vicinity of the vehicle;
    acquiring a maximum braking force of the regeneration brake;
    determining, with the controller, whether the braking by the friction brake has been performed in a condition where the necessary braking force is less than or equal to the maximum braking force of the regeneration brake;
    when it is determined that the braking by the friction brake has been performed in the condition where the necessary braking force is less than or equal to the maximum braking force of the regeneration brake, determining, with the controller, energy consumed by the friction brake;
    generating, with the controller, notification information indicating the consumed energy; and
    causing, with the controller, the generated notification information to be communicated to a driver.

12. The driving support method according to claim 11, further comprising:
    acquiring information indicating a feature ahead of the vehicle as the information indicating the situation in the vicinity of the vehicle; and
    based on the information indicating the feature ahead of the vehicle, acquiring as the necessary braking force, a braking force required to reduce the vehicle's speed to a target speed or less from a position at which the feature ahead of the vehicle will come into the driver's view to a position of the feature ahead of the vehicle.

13. The driving support method according to claim 11, further comprising:
    acquiring information indicating a road grade ahead of the vehicle as the information indicating the situation in the vicinity of the vehicle; and
    based on the information indicating the road grade ahead of the vehicle, acquiring as the necessary braking force, a braking force for preventing the vehicle from accelerating due to the road grade.

14. The driving support method according to claim 11, further comprising:
    acquiring information indicating a state of another vehicle traveling ahead of the vehicle as the information indicating the situation in the vicinity of the vehicle; and
    based on the information indicating the state of the other vehicle, acquiring as the necessary braking force, a braking force required for adjusting an inter-vehicle distance between the vehicle and the other vehicle.

15. The driving support method according to claim 11, further comprising:

acquiring a maximum value of electric power that is acceptable per unit time for charging a battery of the vehicle;

determining, with the controller, a first braking force required to generate the maximum value of electric power that is acceptable per unit time for charging a battery of the vehicle;

acquiring a maximum value of electric power that can be generated by a motor of the vehicle;

determining, with the controller, a second braking force required to generate the maximum value of electric power that can be generated by a motor of the vehicle; and determining, with the controller, the smaller of the first braking force and the second braking force to be the maximum braking force of the regeneration brake.

16. The driving support method according to claim 11, further comprising:

acquiring information indicating a presence of a pedestrian ahead of the vehicle as the information indicating the situation in the vicinity of the vehicle; and based on the information indicating the presence of the pedestrian, acquiring as the necessary braking force, a braking force required to stop before reaching the pedestrian.

17. The driving support method according to claim 11, further comprising:

acquiring information indicating a lane change ahead of the vehicle as the information indicating the situation in the vicinity of the vehicle; and based on the information indicating the lane change, acquiring as the necessary braking force, a braking force required to achieve a safe speed for changing lanes at the lane change.

18. The driving support method according to claim 11, further comprising:

acquiring information indicating a presence of a traffic regulation ahead of the vehicle as the information indicating the situation in the vicinity of the vehicle; and based on the information indicating the presence of the traffic regulation, acquiring as the necessary braking force, a braking force required a braking force required to safely travel through the traffic regulation.

19. The driving support method according to claim 11, further comprising:

acquiring information indicating a turn along the vehicle's route ahead of the vehicle as the information indicating the situation in the vicinity of the vehicle; and based on the information indicating the presence of the turn along the vehicle's route, acquiring as the necessary braking force, a braking force required to achieve a safe speed for turning at the turn.

20. A non-transitory computer-readable storage medium storing a computer-executable driving support program for a vehicle that is capable of performing braking by a regeneration brake and a friction brake, the program comprising:

instructions for determining that braking by the friction brake has been performed;

instructions for acquiring information indicating a situation in the vicinity of the vehicle;

instructions for determining a necessary braking force required for responding to the situation in the vicinity of the vehicle;

instructions for acquiring a maximum braking force of the regeneration brake;

instructions for determining whether the braking by the friction brake has been performed in a condition where the necessary braking force is less than or equal to the maximum braking force of the regeneration brake;

instructions for determining, when it is determined that the braking by the friction brake has been performed in the condition where the necessary braking force is less than or equal to the maximum braking force of the regeneration brake, energy consumed by the friction brake;

instructions for generating notification information indicating the consumed energy; and instructions for causing the generated notification information to be communicated to a driver.

* * * * *